US006901767B2

(12) United States Patent
Wood

(10) Patent No.: US 6,901,767 B2
(45) Date of Patent: Jun. 7, 2005

(54) USE OF HEAT IN COLD STORAGE APPLIANCES

(75) Inventor: Ian David Wood, Lowestoft (GB)

(73) Assignee: Applied Design and Engineering Limited (GB)

( * ) Notice: Subject to any disclaimer, the term of this patent is extended or adjusted under 35 U.S.C. 154(b) by 0 days.

(21) Appl. No.: 10/471,856

(22) PCT Filed: Mar. 13, 2002

(86) PCT No.: PCT/GB02/01155

§ 371 (c)(1),
(2), (4) Date: Sep. 12, 2003

(87) PCT Pub. No.: WO02/073105

PCT Pub. Date: Sep. 19, 2002

(65) Prior Publication Data

US 2004/0079105 A1 Apr. 29, 2004

(30) Foreign Application Priority Data

| Mar. 13, 2001 | (GB) | ............................................... 0106164 |
| Jul. 26, 2001 | (GB) | ............................................... 0118281 |
| Dec. 13, 2001 | (GB) | ............................................... 0129853 |

(51) Int. Cl.[7] ............................................... F25D 3/08
(52) U.S. Cl. ........................................... 62/371; 62/441
(58) Field of Search ............................... 62/371, 228.6, 62/331, 441; 165/59

(56) References Cited

U.S. PATENT DOCUMENTS

| 1,337,696 A | 4/1920 | Ewen |
| 2,077,739 A | 4/1937 | Bryant |
| 2,223,234 A | 11/1940 | Stemme |
| 2,338,889 A | 1/1944 | Yoxsimer |
| 2,360,533 A | 10/1944 | Zeidler |
| 2,386,757 A | 10/1945 | Straubel |
| 2,460,469 A | 2/1949 | Rifkin et al. |
| 2,780,510 A | 2/1957 | Cole, Jr. |
| 2,894,845 A | 7/1959 | Stoddard |
| 2,942,926 A | 6/1960 | Pavelka, Jr. |
| 2,948,498 A | 8/1960 | Johnsen et al. |
| 3,058,320 A | 10/1962 | Foster et al. |
| 3,178,902 A | 4/1965 | Costantini et al. |
| 3,206,943 A | 9/1965 | Rice et al. |
| 3,210,957 A | 10/1965 | Rutishauser et al. |
| 3,230,733 A | 1/1966 | Rutishauser et al. |
| 3,323,625 A | 6/1967 | Webster |

(Continued)

FOREIGN PATENT DOCUMENTS

| CH | 269462 | 7/1950 |
| CH | 663712 A5 | 1/1988 |
| DE | 808845 C | 7/1951 |
| DE | 1129972 B | 5/1962 |
| DE | 1601936 | 3/1971 |
| DE | 2017564 | 10/1971 |
| DE | 2212857 A | 9/1973 |

(Continued)

OTHER PUBLICATIONS

Patent Abstracts of Japan; Nov. 6, 1989; vol. 013, No. 487 (C–649); abstract for JP 01 191618 A, Matsushita Electric Works Ltd., Aug. 1, 1989.

*Primary Examiner*—Melvin Jones
(74) *Attorney, Agent, or Firm*—Stevens & Showalter LLP

(57) ABSTRACT

A cold-storage appliance includes an open-topped insulating container defining an external surface; an insulating lid adapted to close the open top of the container; a cooling means adapted to cool the interior of the container; and a structure supporting the container, the lid and the cooling means; wherein the container is mounted to the structure for movement relative to the structure and the lid to open the container and afford access to its interior or to close the container. A circulating fan or a heater creates air currents to warm the external surfaces of the bin or heating elements can be used to warm the external surfaces of the bin.

27 Claims, 13 Drawing Sheets

U.S. PATENT DOCUMENTS

| | | | |
|---|---|---|---|
| 3,477,243 A | | 11/1969 | Schroeder et al. |
| 3,481,503 A | | 12/1969 | Kloess et al. |
| 3,543,952 A | | 12/1970 | Young |
| 3,772,898 A | | 11/1973 | Anderson |
| 3,866,436 A | * | 2/1975 | Frank et al. .................. 62/382 |
| 3,907,147 A | | 9/1975 | Goobeck |
| 4,019,339 A | | 4/1977 | Anderson |
| 4,085,986 A | | 4/1978 | Taub |
| 4,180,093 A | | 12/1979 | Kamezaki |
| 4,305,625 A | | 12/1981 | Gutner et al. |
| 4,317,607 A | | 3/1982 | Gomolka |
| 4,365,484 A | | 12/1982 | Carson et al. |
| 4,596,427 A | | 6/1986 | Pflugfelder |
| 4,706,466 A | | 11/1987 | Yingst et al. |
| 4,872,798 A | | 10/1989 | Ide |
| 4,898,294 A | | 2/1990 | Jennings |
| 4,899,554 A | | 2/1990 | Kato et al. |
| 4,926,754 A | | 5/1990 | Feuz |
| 5,029,450 A | | 7/1991 | Takano et al. |
| 5,120,118 A | | 6/1992 | Rankin |
| 5,178,655 A | | 1/1993 | Sassier |
| 5,271,240 A | | 12/1993 | Detrick et al. |
| 5,377,498 A | | 1/1995 | Cur et al. |
| 5,661,978 A | | 9/1997 | Holmes et al. |
| 5,865,037 A | | 2/1999 | Bostic |
| 5,921,095 A | | 7/1999 | Lee et al. |
| 5,927,088 A | | 7/1999 | Shaw |
| 6,176,776 B1 | | 1/2001 | Finkelstein et al. |
| 6,282,914 B1 | | 9/2001 | Steinhoff et al. |

FOREIGN PATENT DOCUMENTS

| | | |
|---|---|---|
| DE | 2262277 | 6/1974 |
| DE | 2823048 | 12/1979 |
| DE | 2918222 A | 11/1980 |
| DE | 3015351 | 1/1981 |
| DE | 3126325 A | 1/1983 |
| DE | 3631591 A1 | 7/1987 |
| DE | 4021497 A1 | 1/1992 |
| DE | 4237293 A1 | 5/1994 |
| DE | 19546984 A1 | 6/1997 |
| EP | 0023145 A1 | 1/1981 |
| EP | 0036238 A2 | 9/1981 |
| EP | 0080916 A1 | 6/1983 |
| EP | 0405680 A2 | 1/1991 |
| EP | 0440296 A1 | 8/1991 |
| EP | 0518183 A1 | 12/1992 |
| EP | 0720824 A2 | 7/1996 |
| EP | 0754636 A1 | 1/1997 |
| EP | 0819898 A2 | 1/1998 |
| FR | 933333 | 4/1948 |
| FR | 1377844 | 11/1964 |
| FR | 2777985 | 10/1999 |
| GB | 341745 | 1/1931 |
| GB | 418489 | 10/1934 |
| GB | 579071 | 7/1946 |
| GB | 581121 | 10/1946 |
| GB | 602329 | 5/1948 |
| GB | 602590 | 5/1948 |
| GB | 620460 | 3/1949 |
| GB | 628939 | 9/1949 |
| GB | 642475 | 9/1950 |
| GB | 948223 | 1/1964 |
| GB | 1143926 | 2/1969 |
| GB | 1188881 | 4/1970 |
| GB | 1400685 | 7/1975 |
| GB | 1430789 | 4/1976 |
| GB | 1484282 | 9/1977 |
| GB | 1551044 | 8/1979 |
| GB | 2154553 A | 9/1985 |
| GB | 2161064 A | 1/1986 |
| GB | 2197639 A | 5/1988 |
| GB | 2317595 A | 4/1998 |
| GB | 2354061 A | 3/2001 |
| JP | 1262387 A | 10/1989 |
| JP | 1262390 A | 10/1989 |
| JP | 10220884 A | 8/1998 |
| JP | 11193966 A | 7/1999 |
| WO | WO 85/00422 A1 | 1/1985 |
| WO | WO 01/20237 A1 | 3/2001 |
| WO | WO 01/26532 A1 | 4/2001 |
| WO | WO 01/71263 A1 | 9/2001 |
| WO | WO 02/22993 A1 | 3/2002 |
| WO | WO 02/073104 A1 | 9/2002 |
| WO | WO 02/073107 A1 | 9/2002 |

* cited by examiner

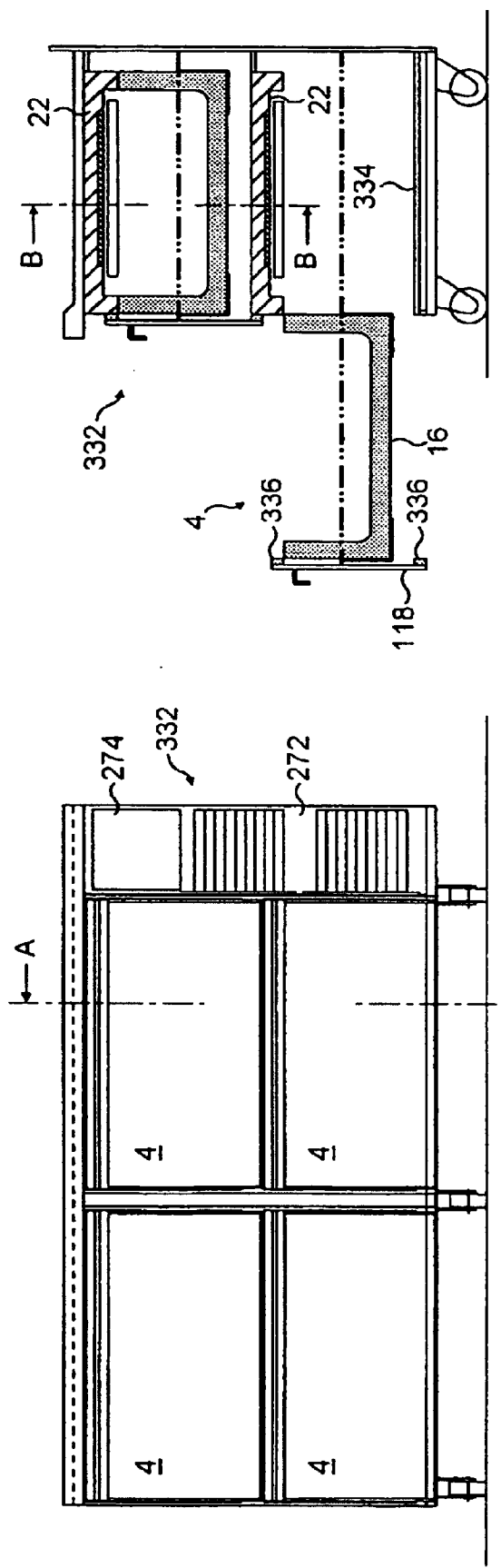
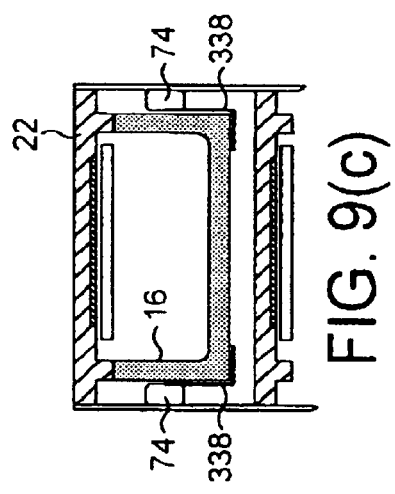
FIG. 9(a)
FIG. 9(b)
FIG. 9(c)

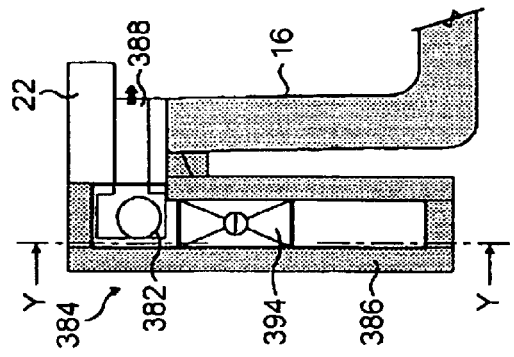
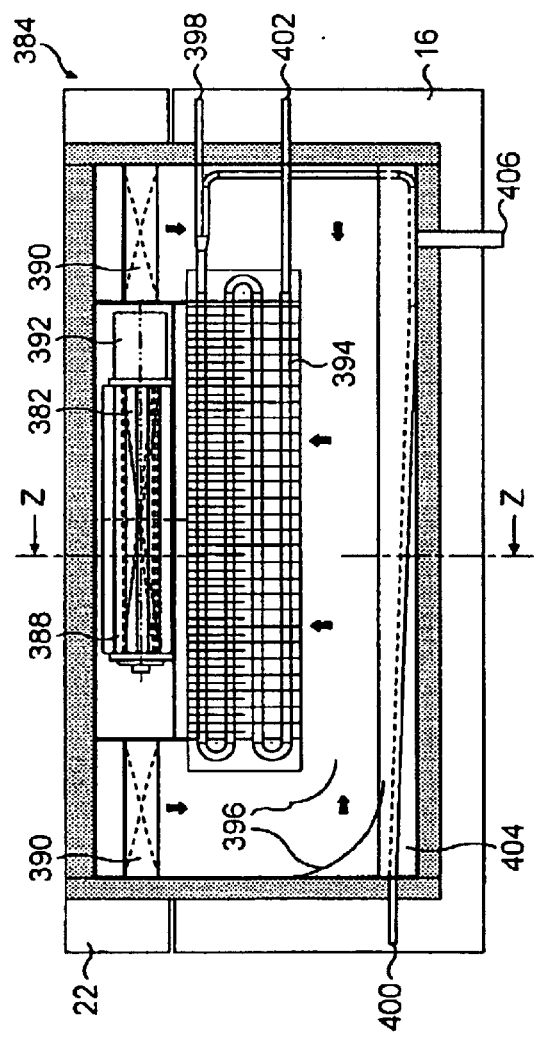
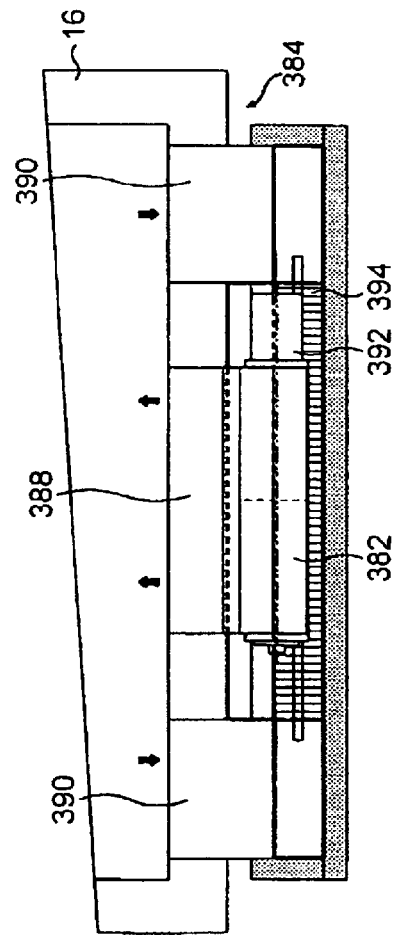
FIG. 14(b)
FIG. 14(a)
FIG. 14(c)

USE OF HEAT IN COLD STORAGE APPLIANCES

BACKGROUND OF THE INVENTION

1. Field of the Invention

This invention relates to the art of cold storage, including appliances such as refrigerators and freezers for storing foodstuffs and other perishables. Other applications of the invention include storage of chemicals and medical or biological specimens. The invention also finds use in mobile applications, for example in the transport and storage of perishable goods.

The invention develops and adds to the various features of the Applicant's co-pending International Patent Application No. PCT/GB00/03521 published as WO 01/20237, and co-pending U.S. patent application Ser. No. 10/070,896, the contents of which are incorporated herein by reference. The invention is also derived from UK Patent Application No. 0106164.7 published as GB 2367353, the content of which is also incorporated herein by reference and from which, inter alia, the present application claims priority. As in those specifications, the invention can be applied to storing any items within a cooled environment, such as in a refrigerated goods vehicle. The term 'appliance' is therefore to be construed broadly, extending beyond fixed domestic devices into industrial, scientific and mobile applications. However, this specification will particularly describe domestic or commercial cold-storage appliances for storing foodstuffs.

2. Description of the Related Art

Briefly to recap the introduction of WO 01/20237, the advantages of storing foodstuffs and other perishable items in refrigerated and segregated conditions have long been known: refrigeration retards the degradation of such items and segregation helps to prevent their cross-contamination. Accordingly, modern cold-storage appliances such as refrigerators and freezers are usually compartmentalised, albeit not often effectively, so that a user can store different types of food in different compartments. All such appliances have the additional aim of maximising their energy efficiency.

The invention herein and the inventions in WO 01/20237 and GB 2367353 were devised against a background of typical cold-storage appliances, most of which comprise one or more upright cabinets each with a vertically-sealed hinged door on its front. Substantially all of the interior of the cabinet defines a storage volume, most commonly partitioned by shelves or drawers for supporting stored foodstuffs. Access to all of the shelves or drawers in the cabinet is gained by opening the door.

A cooler unit generates a convection loop within the cabinet, in which air cooled by the cooler unit sinks toward the bottom of the cabinet and as that air absorbs heat during its downward journey, it warms and rises back up to the cooler unit where it is cooled again. It is also possible to have forced-air circulation by means of a fan within or communicating with the cabinet. The shelves or drawers are typically made of wire so that they offer little resistance to this circulation of air.

Upright refrigerators and freezers are often combined and sold as a single-cabinet 'fridge freezer' unit with a refrigerator occupying an upper compartment and the freezer occupying a lower compartment, or vice versa. As different temperatures are required for the two compartments, they are partitioned by a solid divide and each compartment has its own door and cooler unit, conventionally in the form of an evaporator.

The domestic fridge freezer usually has only one compressor and the refrigerator evaporator is in series with the freezer evaporator. In that case, temperature control and measurement is usually confined to the refrigerator compartment. Where temperature control is required in both compartments, the evaporators are in parallel and have respective solenoid valves and temperature switches providing on/off cooling mass control to each compartment. In either case, however, the temperature within the respective compartments cannot be duplicated: one compartment is for chilling, so it has less insulation than the other and its temperature can be adjusted within a range above zero Celsius, and the other is for freezing, so it has more insulation than the other and its temperature can be adjusted (if at all) within a range below zero Celsius. Neither compartment can do the job of the other.

WO 01/20237 addresses a major problem with upright refrigerators and freezers, namely the upright door which, when opened, allows cold air to flow freely out of the cabinet to be replaced by warm ambient air flowing in at the top. That rush of ambient air into the cabinet causes its internal temperature to rise, hence consuming more energy in redressing that rise by running the cooler unit. The incoming ambient air introduces the possibility of airborne contamination, and moisture in that air also gives rise to condensation and ice within the cabinet. The more often and frequently the cabinet is opened, as may happen especially in commercial cold storage appliances, the worse these problems get.

In upright-door arrangements, the limitations of the vertical seal mean that loss of cold air and induction of warm air can even occur when the door is closed. Being denser than warmer air, the coldest air collects at the bottom of the cabinet and applies pressure to the sealing interface so that unless the seal forms a perfect seal between the door and the cabinet, that air will escape.

The present invention and WO 01/20237 also address the problems inherent in the well-known chest freezer, whose open-topped cabinet is typically closed by a horizontally-hinged upwardly-opening lid. Such a chest freezer is inconvenient and wasteful of space because it precludes use of the space immediately above the freezer, which space must be preserved to allow its lid to be opened. Even if a sliding lid is used instead of an upwardly-opening lid, items cannot be left conveniently on top of the lid. It is also well known that large chest freezers can make access to their contents extremely difficult, it being necessary to stoop down and shift numerous heavy and painfully cold items to get to items at the bottom of the freezer compartment.

Finally, the present invention and WO 01/20237 address the problem of segregating different types of foodstuff or other perishable items to avoid cross-contamination. In typical cold-storage appliances, segregation of food is compromised by the convection and/or forced-air principles on which those appliances rely. The substantially open baskets or shelves designed to promote convective circulation of air between the compartments also promote the circulation of moisture, enzymes and harmful bacteria. In addition, any liquid that may spill or leak, such as juices running from uncooked meats, will not be contained by the open baskets or shelves.

Conventional cold-storage appliances exemplified by upright refrigerators and chest freezers are not the only prior art disclosures of interest. For example, it has been known for many years to divide a refrigerator into compartments, each with its own dedicated door or lid. Examples of this idea are disclosed in UK Patent Nos. GB 602,590, GB 581,121 and GB 579,071, all to Earle, that describe cabinet-like refrigerators.

In those Earle documents, the front of the cabinet is provided with a plurality of rectangular openings for receiving drawers. Each drawer has a front panel larger than its respective opening so that a vertical seal is formed around the overlap when the drawer is in a closed position. The drawers and their contents are cooled by a cooler unit that circulates cooled air by convection within the cabinet, in common with the types of refrigerator already described. To promote circulation of this air amongst all of the drawers, the drawers are open-topped and have apertures in their bottoms. Also, the drawers are disposed in a stepped arrangement, those at the top of the refrigerator extending back less far into the cabinet than the lower drawers so that the rear of each drawer is exposed to the downward flow of cooled air from the cooler unit.

Although only one drawer need be opened at a time, the apertures in the bottom allow cold air to flow freely from the open drawer, which is replaced by warm moist ambient air to the detriment of energy efficiency and with the increased possibility of cross-contamination. Indeed, when a drawer is opened, cold air within the cabinet above the level of that drawer will flood out, drawing ambient air into the cabinet. Furthermore, the drawers encourage ambient air to flow into the interior of the refrigerator because, upon opening, they act as pistons drawing the ambient air into the interior of the refrigerator cabinet. Once in the cabinet, the warm air can circulate as freely as the cold air that is supposed to be there.

Even when closed, the accumulation of cold air towards the bottom of the cabinet will exert increased pressure on the vertical seals of the lowest drawers, increasing the likelihood of leakage if the seal is faulty.

A further example of the above type of refrigerator is disclosed in UK Patent No. GB 602,329, also to Earle. The refrigerator disclosed therein suffers many of the above problems but is of greater interest in that a single drawer consisting of insulated sides and base is provided within the cooled interior of the cabinet. In contrast to the variants outlined above, the sides and base are solid and not perforated so that air cannot flow through them. When the drawer is closed, a horizontal member within the cabinet combines with the drawer to define a compartment, the horizontal member thus being a lid for the drawer. This compartment is provided with its own cooling coils situated just below the horizontal member.

Very little detail is given about the seal that is formed between the drawer and the horizontal member, other than that the horizontal member has a downwardly projecting rear end with a biased edge that makes a close fit with the rear wall of the drawer. Nothing else is said about the junction between the drawer and the horizontal member, apart from the general statement that the drawer is adapted when in its closed position to fit 'fairly snugly' against the horizontal member. It can only be inferred that the drawer and the horizontal member merely abut against each other. Whilst this will impede the passage of air into and out of the drawer, it will not form an impervious seal. As this is not a vapour seal, icing and cross-contamination is likely to occur even when the drawer is closed.

The drawer arrangement described creates a compartment in which a different temperature can be set when compared to the essentially common temperature of the rest of the refrigerator. It is particularly envisaged that the drawer can act as a freezer compartment. The Applicant has appreciated a disadvantage in this arrangement, namely that as the freezer drawer resides within the cooled interior when closed, the outer surfaces of the drawer within the cabinet will be cooled to the temperature of the refrigerator. Accordingly, when the drawer is opened, those cooled outer surfaces will be exposed to ambient air containing moisture that will condense on the cooled surfaces leading to an undesirable accumulation of moisture. Condensation involves transfer of latent heat from water vapour to the drawer, thus increasing the burden of cooling the drawer again when the drawer is returned to the closed position within the cabinet.

Additionally, condensed moisture will be transferred to the interior of the refrigerator when the drawer is closed. As discussed above, the presence of water promotes microbial activity. A further disadvantage of introducing water into the interior of the refrigerator is that it may freeze: this can be a particular problem where the drawer of the enclosed compartment meets the insulated top, as any ice formation will form a seal that locks the drawer in a permanently closed position. In fact, the of ice formation is due to moisture migration across the interface between the drawer and the top. This disadvantage was appreciated by Earle, as a cam mechanism is mentioned in GB 602,329 to break any ice formed at the seals or on the runners or other support surfaces of the drawers. It is also possible for a build-up of ice to affect the sealing ability of the seal, by preventing mating sealing surfaces from mating correctly. Of course, the accumulation of ice on moving parts of the drawer mechanism is also undesirable as it will impede movement of the drawer.

A further interesting prior art document, cited as technological background against WO 01/20237, is U.S. Pat. No. 1,337,696 to Ewen. Ewen speaks of segregation between refrigerated drawers contained in a surrounding cabinet and employs refrigerating units placed 'immediately and closely above each drawer ... so that said drawer may in effect be said to be closed against said refrigerating unit'. However, there has to be a gap left between the drawer and the refrigerating unit if the drawer is going to open. As in Earle, that gap will promote icing as moist air within the cabinet migrates into the drawer and the water vapour condenses and freezes. The smaller the gap, the sooner the accumulating ice will prevent drawer movement. If a larger gap is tried instead, there will be a greater spillage of air and hence the refrigerator will be less energy-efficient and more susceptible to cross-contamination.

That aside, the spillage of cold air in Ewen lowers the temperature within the cabinet around the drawers, and so increases the likelihood of condensation on the drawers when opened. It will be noted that cold air spilled in this way can fall freely behind the drawers within the cabinet and so expose the exterior of the drawers to air substantially below ambient temperature. Certain design details of Ewen worsen this effect. For example, the bottom wall of the Ewen unit is an efficient insulator which will significantly reduce the surface temperature of the drawers. Also, the internal divisions between the drawers do not allow for ambient heat transfer to the drawers but only for heat transfer between the drawers, thus promoting drawer-to-drawer temperature equalisation over time. Left for long periods, or even overnight, large parts of the external surface of each drawer will fall to temperatures significantly below ambient dew point. Condensation or ice will therefore form on those surfaces as soon as the drawers are opened; similarly, if the drawers are removed and left outside the appliance, they will start to 'sweat' with condensation.

Like Earle, opening and closing a drawer within a sealed cabinet in Ewen acts like a piston, alternately applying both negative and positive pressures to adjacent areas. This promotes air transfer through the drawer opening at the front of the cabinet, which can displace cold treated air in a drawer, and within the cabinet itself. An over-sized cabinet would reduce the piston effect but would also be wasteful of space. Conversely, a more space-efficient close-fitting cabinet may decrease the displacement of cold treated air, and so reduce the burden of cooling the warmer air that takes its place, but it will increase resistance to opening and closing the drawer.

Cold air spillage aside, the gap inevitably left between a drawer and its associated lid in prior art arrangements is large enough to allow the passage of enzymes, spores and other airborne contaminants. Also, Ewen discloses a common interconnecting drain and this too would allow free transfer of contaminants between each drawer, particularly under the aforementioned piston action.

Whilst Ewen speaks of different temperatures in different drawers, the plurality of cooling lids are connected in series and have no means for individual temperature control in each drawer. The different temperatures are designed-in by providing some drawers with more cooling elements than others, but there is no measurement or control of those temperatures in use. Also, like the compartments of more conventional prior art, each drawer in Ewen has a fixed function, namely freezer or refrigerator.

Even if removed from the appliance, Ewen's drawers will stay attached to their drawer fronts and runners. This does not lend the drawers to temporary storage or transport. Moreover, like Earle, the drawers in Ewen cannot be opened fully: they can only be opened less than half-way while being supported by the structure of the appliance. This is to the detriment of access to, and visibility and illumination of, the contents.

It is against this background that the present invention has been devised.

SUMMARY OF THE INVENTION

In one aspect, the invention resides in a cold-storage appliance including: an open-topped insulating container defining an external surface; an insulating lid adapted to close the open top of the container; a cooling means adapted to cool the interior of the container; and a structure supporting the container, the lid and the cooling means; wherein the container is mounted to the structure for movement relative to the structure and the lid to open the container and afford access to its interior or to close the container, and wherein the external surface of the container is exposed to air above ambient temperature when the container is closed by the lid. This aspect of the invention further reduces icing and condensation associated with the exterior of the container.

BRIEF DESCRIPTION OF THE DRAWINGS

In order that the present invention can be more readily understood, reference will now be made, by way of example only, to the accompanying drawings in which:

FIGS. 9(a), 9(b) and 9(c) are a front elevation and two sectional views respectively of a cold-storage appliance that is functionally akin to the aforementioned Ewen prior art but addresses many of its problems;

FIGS. 14(a), 14(b) and 14(c) are sectional views showing a fan coil arrangement, FIG. 14(a) being a sectional view from behind a bin on line Y—Y of FIG. 14(b), FIG. 14(b) being a partial sectional view from the side of a fan coil unit on line Z—Z of FIG. 14(a), and FIG. 14(c) being a partial sectional view from above a fan coil unit on line X—X of FIG. 14(a).

DETAILED DESCRIPTION OF THE INVENTION

Figure 1:
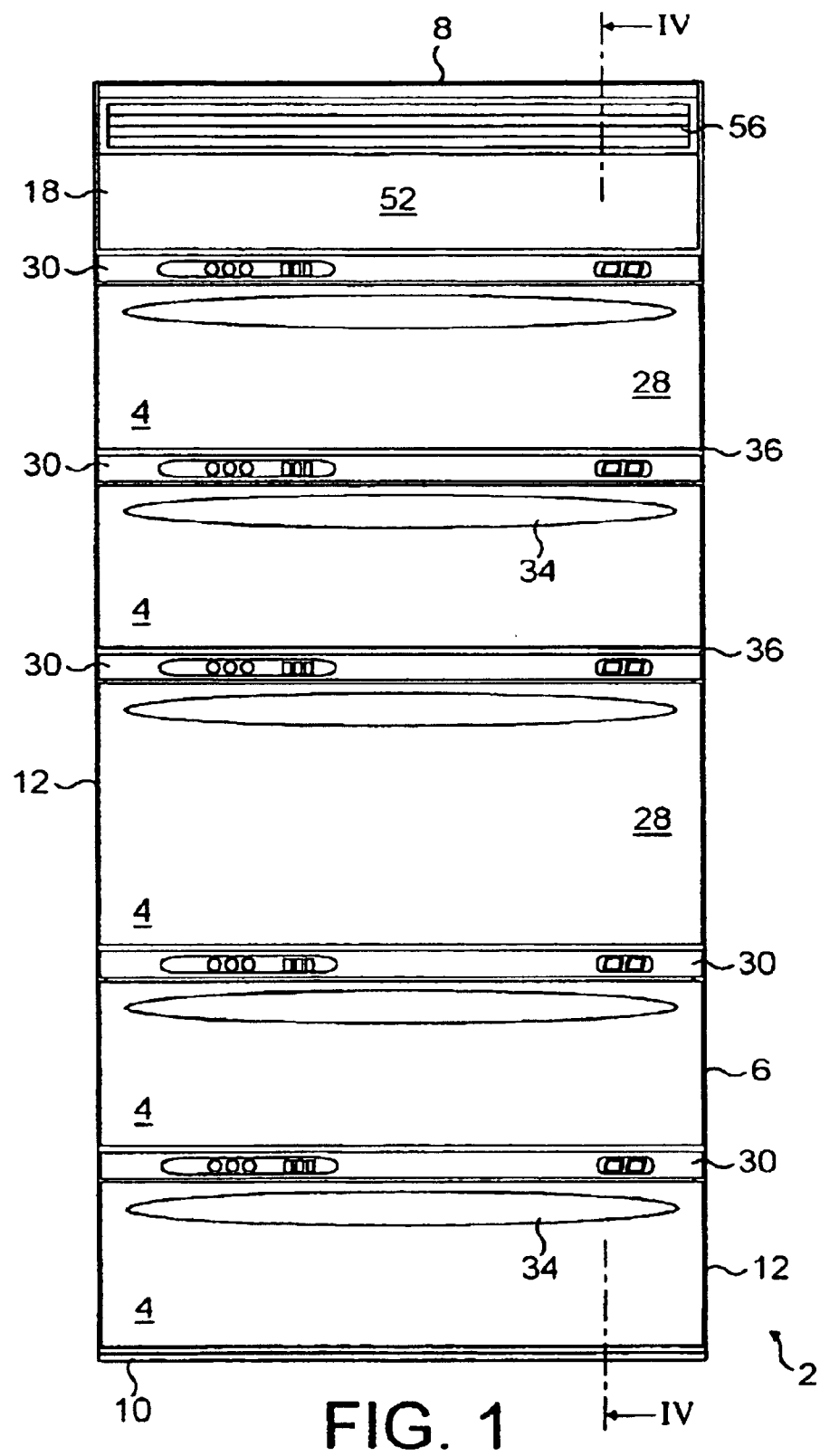
FIG. 1 is a front view of a refrigerator/freezer appliance as disclosed in the Applicant's referenced co-pending International and U.S. patent applications showing a vertical array of drawers each including a bin.

Whilst the disclosure of the Applicant's co-pending International Patent Application No. PCT/GB00/03521 (WO 01/20237) and U.S. patent application Ser. No. 10/070,896 are incorporated herein by reference, FIGS. 1 to 4 thereof are reproduced in the drawings appended to this specification and will now be described to help put the present invention into context.

FIGS. 1 to 4 show a refrigerator/freezer appliance 2 according to Applicant's referenced International and U.S. patent applications. The appliance 2 is of upright cuboidal configuration, and comprises five rectangular-fronted drawers 4 arranged one above another and housed in a cabinet 6 comprising top 8, bottom 10, side 12 and rear 14 panels. Any of these panels can be omitted if it is desired to build the appliance 2 into a gap between other supporting structures; in particular, the side panels 12 can be omitted if neighbouring cupboards can be relied upon for support or otherwise to perform the function of the side panels 12. The panels 8, 10, 12, 14 may or may not be structural but if they are not, a frame (not shown) provides support for the various parts of the appliance. If a frame is provided, it is structurally unnecessary to have panels.

Figure 2:
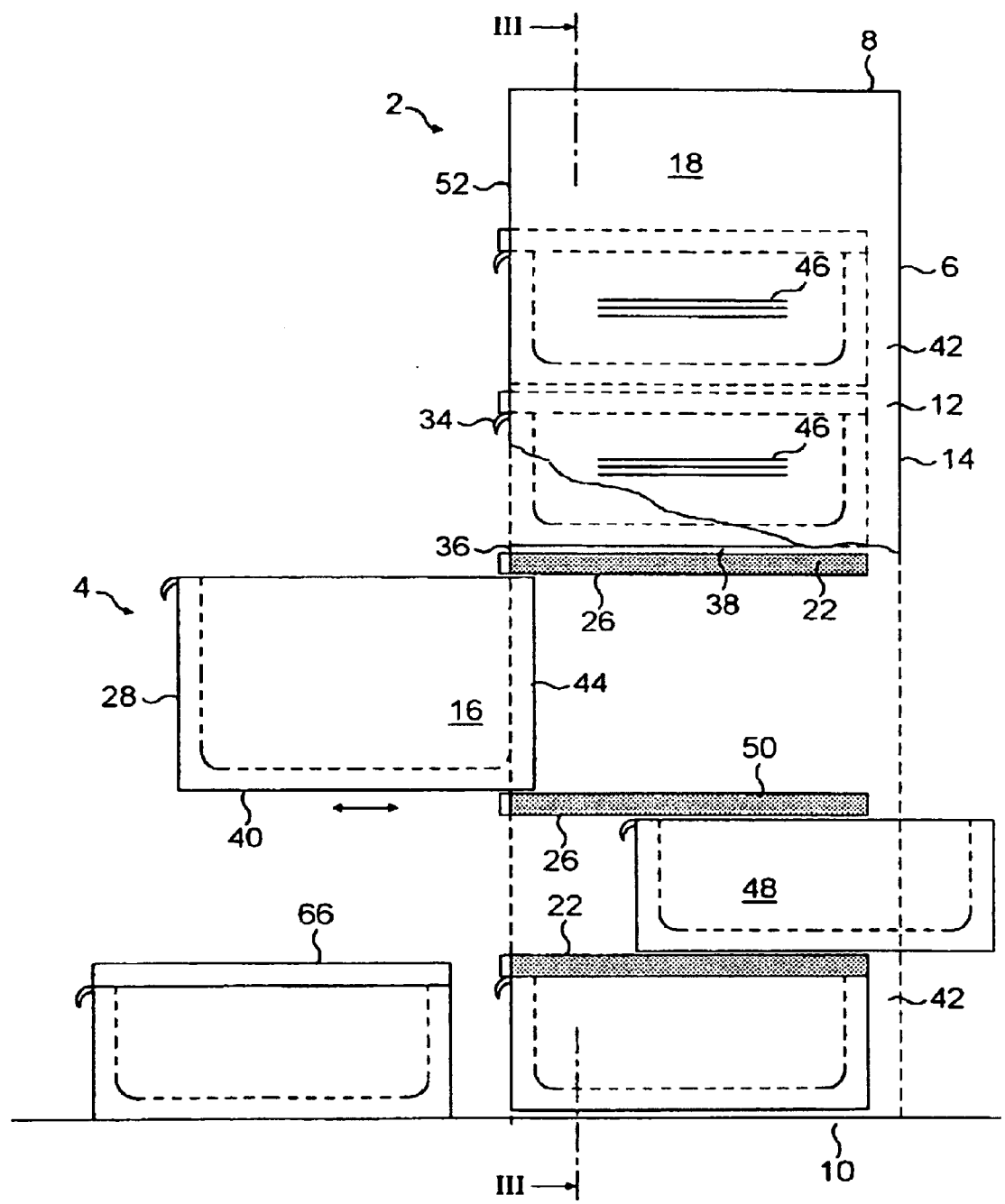
FIG. 2 is a side view of the appliance of FIG. 1, with a lower portion of a side panel removed so that the sides of the drawers can be seen.

The drawers 4 can be slid horizontally into and out of the cabinet 6 by means of tracks or runners on the sides of the drawers 4 that will be described in more detail below. If there is no back panel 14, it is theoretically possible for a drawer 4 to be removed from the cabinet 6 in more than one direction, as shown in FIG. 2.

Each drawer 4 comprises an insulated open-topped bucket-like container 16, at least one container 16 (in this case, that of the central drawer 4) being of a different depth to the other containers 16 to define a different internal volume. These containers 16 will be referred to in this specific description as storage bins or more simply as bins 16. The bottom bin 16 leaves only a narrow gap to the bottom panel 10 of the cabinet 6, whereas the top bin 16 leaves a substantial space at the top of the appliance 2 under the top panel 8, allowing room for a compartment 18 that accommodates a refrigerator engine 20, for example including condenser and compressor means as is well known.

The relatively deep bin 16 of central drawer 4 is intended to hold bottles and other relatively tall items stored upright, whereas the other, relatively shallow bins 16 are for correspondingly shallower items. Compared to the shelves and other compartments defining the main storage volume of a conventional upright cold-storage appliance, all of the bins 16 have a favourable aspect ratio in terms of the substantial width of the access opening compared to the depth of the compartment thereby accessed. It is therefore very easy to reach every part of the interior of a bin 16 when a drawer 4 is opened, The interior of the cabinet 6 is divided by five insulated lids 22, one for each drawer 4, that are generally planar and horizontally disposed. When a drawer 4 is closed, the open top of its associated bin 16 is closed by an appropriate one of the lids 22 in a manner to be described. The lids 22 include cooling means 24 being evaporator elements of known type disposed in the lower face 26 of each lid 22 to cool the contents of a bin 16 closed by that lid 22.

Each bin 16 has a generally flat front face 28 that is exposed when the drawer 4 is closed. The front face 28 could be provided with a decorative panel as is well known. When the drawer 4 is closed, the front face 28 of the bin 16 is bordered at the top by a control and display panel 30 dedicated to that bin 16, the panel 30 being co-planar with the front face 28. The panel 30 is supported by the front edge 32 of the appropriate lid 22, the panel 30 being recessed into the front edge 32 of the lid 22.

The control and display panel 30 contains a number of displays, switches and audible alarms, thus providing a user interface for each bin 16. For example, the interface will most commonly be used for selecting the temperature to which the bin 16 is to be cooled, but also contains temperature displays, on/off and fast-freeze switches, a light indicating when the drawer 4 is open and an audible alarm to indicate when the drawer 4 has been open longer than a predetermined time or when the temperature inside the bin 16 has reached an upper or lower threshold.

A rounded handle 34 extends across substantially the entire width of the top portion of the front face 28 to enable the drawer 4 to be pulled out when access to the interior of the bin 16 is required.

The bottom of the front face 28 of each bin 16 is bordered by a slot 36 that, as will be described, admits ambient air into the cabinet 6. To do so, each slot 36 communicates with an air gap 38 extending beneath the entire bottom face 40 of the associated bin 16 to meet a void 42 maintained behind each bin 16, the void 42 being defined by the inner surfaces of the back 14 and side 12 panels of the cabinet 6 and the backs 44 of the bins 16. As can be seen particularly from FIG. 4, the void 42 extends behind each bin 16 from the base panel 10 of the cabinet 6 to communicate with the refrigerator engine compartment 18 at the top of the cabinet 6.

Figure 3:
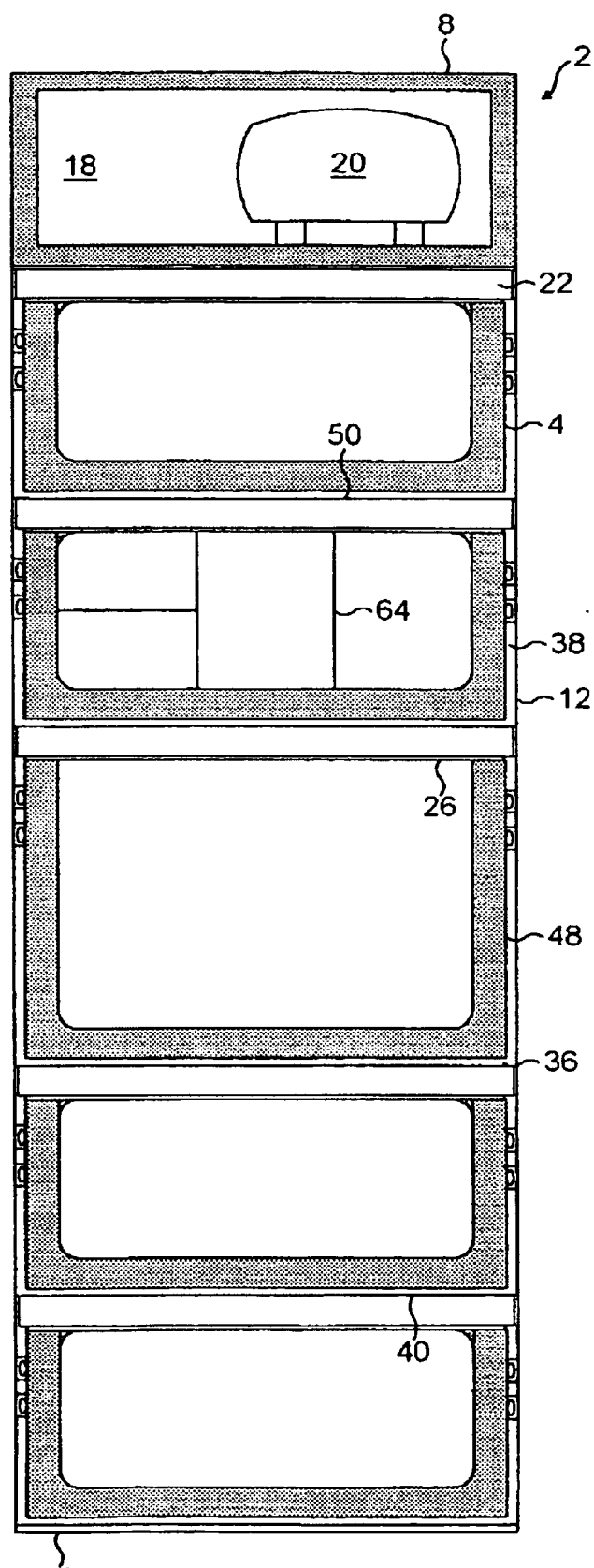
FIG. 3 is a section along line III—III of FIG. 2 but with the drawers closed.
Figure 4:
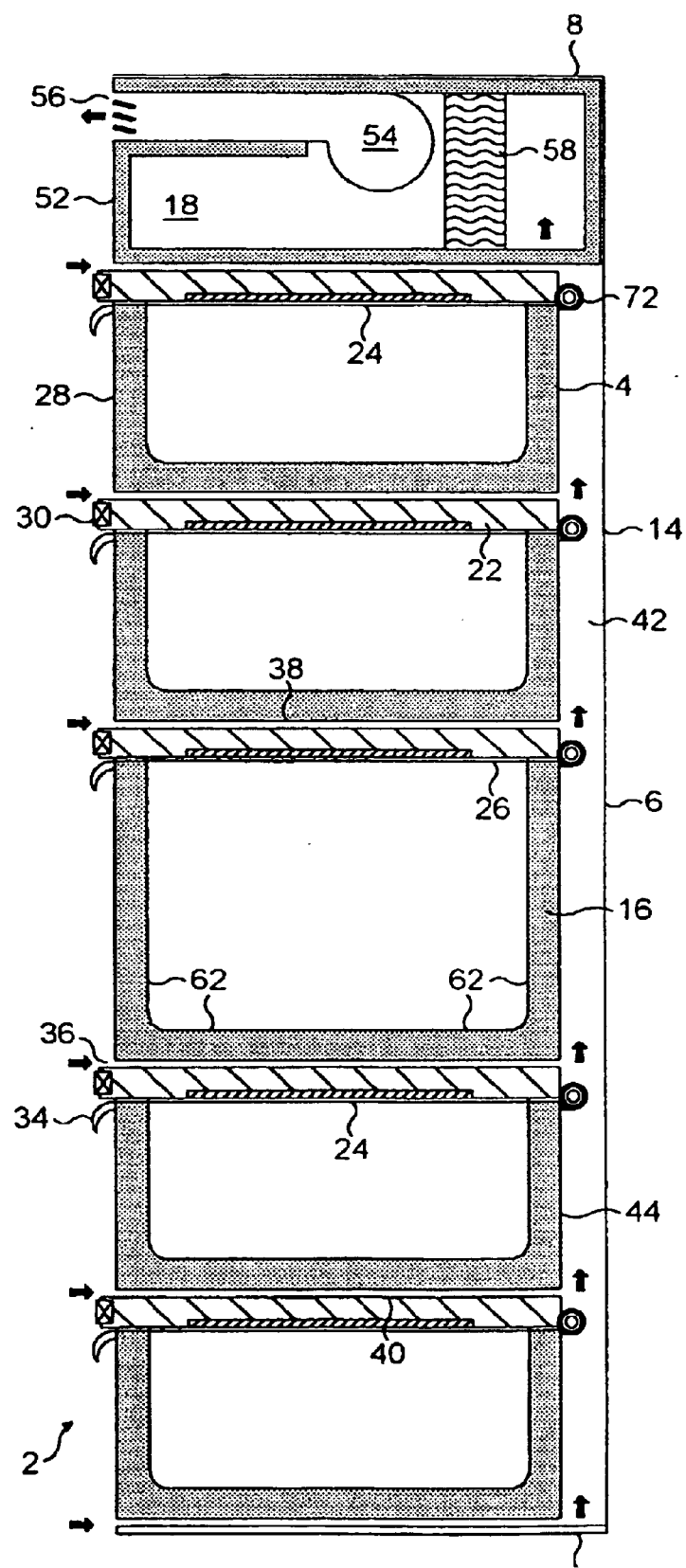
FIG. 4 is a section along line IV—IV of FIG. 1.

The air gaps 38 beneath the bins 16 and the void 42 behind the bins 16 also communicate with air gaps 38 to the sides 48 of the bins 16. Optionally, vents 46 are provided in the side panels 12 of the cabinet 6 adjacent to the bins 16 through which ambient air can also be admitted. As best illustrated in FIGS. 3 and 4, air gaps 38 extend around all bar the top side of each bin 16, so that ambient air entering the cabinet 6 through the slots 36 can circulate freely around the sides 48, bottom 40 and rear 44 of each bin 16. It will also be noted that ambient air can circulate freely over the top surface 50 of each lid 22. To allow this airflow over the uppermost lid 22, which does not have a bin 16 above, a slot 36 is provided under the front face 52 of the refrigerator engine compartment 18.

It will be noted that the piston action created by opening a drawer 4 that sucks ambient air into the interior of the appliance 2 does not pose a problem in this invention. In fact, this action is advantageous as it promotes circulation of ambient air within the cabinet 6.

FIG. 4 shows that the refrigerator engine compartment 18 includes an impeller 54 exhausting through apertures 56 provided in the front face 52 of the refrigerator engine compartment 18. As best seen in FIG. 1, these apertures 56 extend horizontally across the width of the front face 52. The impeller 54 communicates with the void 42 behind the bins 16 to draw air from the void 42, thus continuously promoting the induction of ambient air through the slots 36 and the optional side vents 46. Upon entering the refrigerator engine compartment 18, this air is drawn through the heat-exchange matrix 58 of the condenser.

Accordingly, ambient air entering the cabinet 6 through the front slots 36 and, if provided, the side vents 46, leaves the cabinet 6 through the apertures 56 provided in the front face 52 of the refrigerator engine compartment 18, and so ambient air is circulated through the cabinet 6. More specifically, ambient air enters the appliance 2 where it immediately comes into contact with the outer surfaces 40, 44, 48 of the bins 16 and warms them to ambient temperature (or substantially so, as a surface resistance effect means that a sub-ambient boundary layer will remain due to the temperature gradient across the thickness of the bin wall) before being drawn towards the void 42 and then upwards through the void 42 by the circulation of the air. The arrows of FIG. 4 demonstrate this circulation of air through the appliance 2. Accordingly, the interior of the cabinet 6 is kept close to ambient temperature, and only the interior of each bin 16 is cooled.

By exposing the external surfaces 28, 40, 44, 48 of the bin 16 to warmer air than it contains, there is no problem with condensation on the external surfaces 28, 40, 44, 48, and hence no problem with latent heat transfer to the bin 16 or the icing and cross-contamination difficulties of condensed water entering the cabinet 6.

In any event, cross-contamination would be unlikely to occur because each bin 16 is tightly sealed when its drawer 4 is closed. So, even if microbes enter the cabinet 6, they cannot readily gain access to other bins 16. It is also unlikely that two bins 16 would be open together at any given time. It would be possible to include means for enforcing this, for example using a mechanism akin to that used in filing cabinets for anti-tilt purposes, by preventing more than one drawer 4 being opened at a time. Such a mechanism will be described later.

When a bin 16 is open, its open top does not suffer much spillage of cold air, and when a bin 16 is closed, the horizontal seals 60 apt to be used in the invention are inherently better at sealing-in cold air than the vertical seals commonly used in upright refrigerators and freezers. Whilst horizontal seals are known in chest freezers, this invention does not suffer the inconvenience and space problems of chest freezers, instead being akin in those respects to the much more popular upright appliances. The seals 60 can have magnetic qualities, for example being operable by permanent magnets or electromagnets, or may employ hydraulics or pneumatics to expand or contract them.

As there has to be a large temperature gradient between the cooled inner surfaces 62 of each bin 16 and its outer surfaces 28, 40, 44, 48, the bins 16 are constructed from an efficient insulating material so that the gradient is easily maintained with the outer surfaces 28, 40, 44, 48 remaining close to the ambient temperature. Materials such as phenolic foam or polyurethane foam (optionally skinned with GRP or a polycarbonate in a composite structure) are particularly preferred for the construction of the bins 16.

If segregation of the contents of a particular bin 16 is required, that bin 16 may be fitted with removable inserts 64. The inserts 64 are of varying shape and dimensions and may be used to define many types of compartments. For instance, an insert 64 may be a thin partition with a length corresponding to the length or width of the bin 16 in which it is received. An insert 64 may be a box, with or without a lid, or an insert 64 may include clips for holding bottles in place or trays for holding eggs or the like. An insert 64 could also be a wire basket or shelf.

As can be seen in FIG. 2, one or more of the bins 16 can be removed from the appliance 2 and fitted with an insulated transport cover 66. The bin 16 may then be taken away from the appliance 2, its insulated construction ensuring that it keeps its contents cool for a limited period of time. For instance, the bin 16 may be used as a cool-box, possibly in conjunction with ice-packs to keep the interior cool for as long as possible. Alternatively, the bin 16 with transport cover 66 may be kept close to the appliance 2 to provide added temporary cooled storage capacity, further bins 16 being fitted to the appliance 2 in that event. Further details of transport cover arrangements will be given later.

It is also possible for a transport cover 66 to include a refrigerator engine powered internally by batteries or a gas supply or externally by mains electricity or a vehicle electricity supply.

Although not shown in the general views of FIGS. 1 to 4, the Applicant's referenced co-pending International and U.S. patent applications disclose ways in which a bin 16 can be moved with a major horizontal component of movement to gain access to the interior of the bin 16 and, during that access movement, also with a minor vertical component of movement to clear the lid 22

Figure 5A:
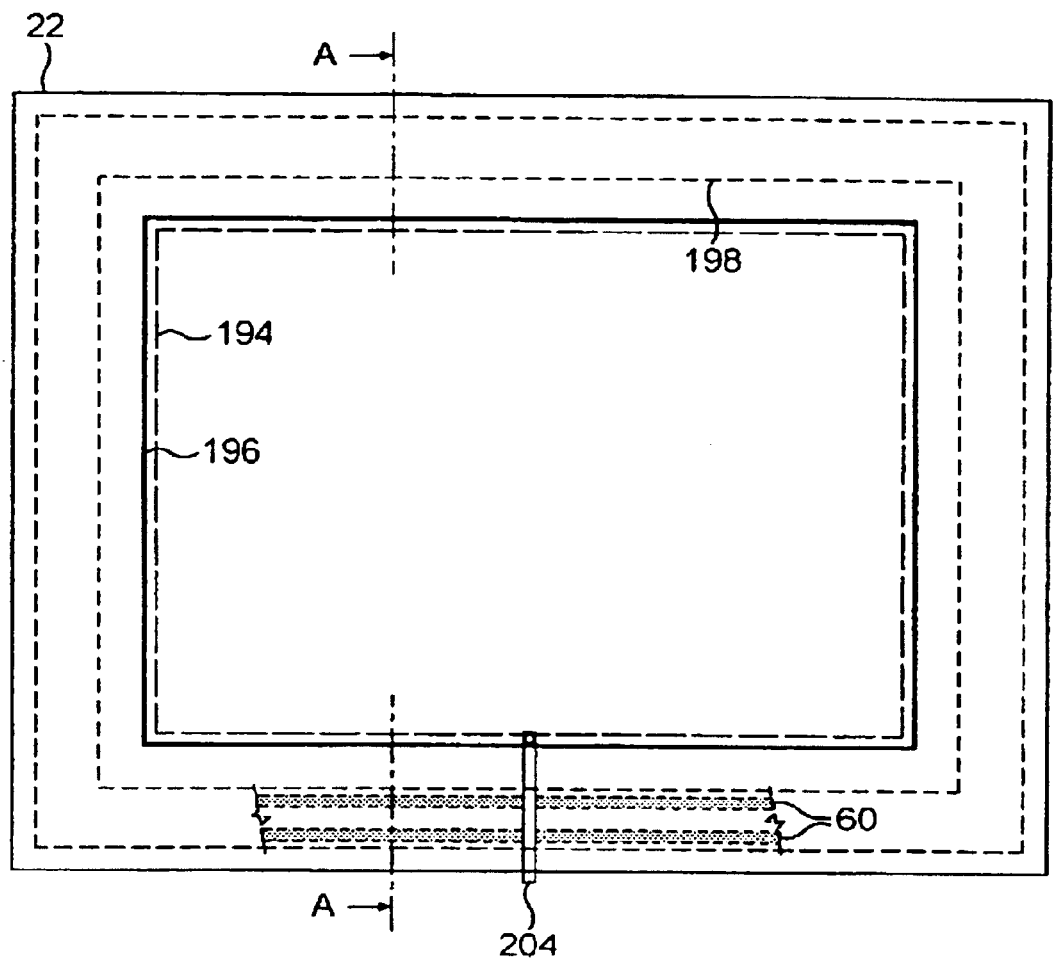
FIGS. 5(a) and 5(b) are a plan view and a sectional side view respectively of a lid showing its sealing, cooling and drainage facilities in detail.
Figure 5B:
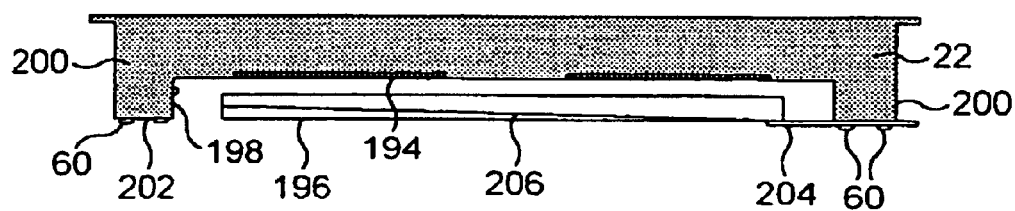

FIGS. 5(a) and 5(b) show preferred details of the lids 22 to which the bins 16 seal when fitted in the appliance 2. FIG. 18(a) shows that the lid 22 is oblong in plan view. The oblong dashed outlines of features below the lid 22 are also apparent. Starting inwardly and moving outwardly, those features are an evaporator 194 disposed centrally on the underside of the lid 22, a drain pan 196 disposed beneath the evaporator 194 to catch water that drips from the evaporator 194, and a recess 198 in the underside of the lid 22 that accommodates both the drain pan 196 and the evaporator 194.

As best appreciated from FIG. 5(a), which is a cross-section on line A—A of FIG. 5(a), the recess 198 is bounded by a peripheral skirt 200 depending from the lid 22. A pair of oblong compressible seals 60 lie one within the other on the lower end face 202 of the skirt 200. Those seals 60 are continuous save for an opening that accommodates an oblong-section drainage duct 204 leading rearwardly from the drain pan 196. The drain pan 196 has an inclined base 206 to lead water toward that drainage duct 204, from which the water is channelled away from the lid 22 as FIG. 6 will explain. A temperature sensor (not shown) can penetrates the skirt 200 above the seals 60 to measure the temperature within the cavity sealed by the bin 16 and the lid 22.

Figure 6:
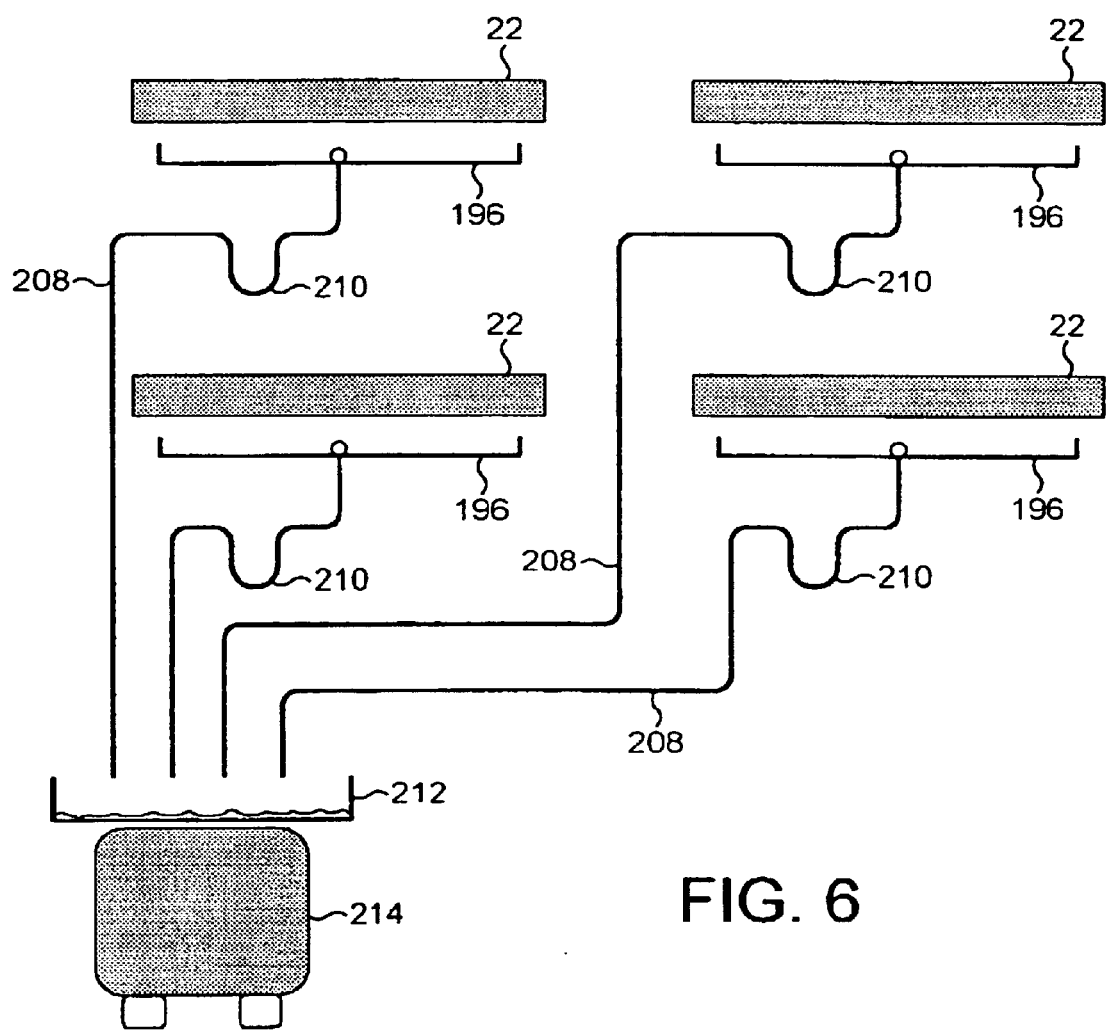
FIG. 6 is a diagrammatic view of a plurality of the lids of FIGS. 5(a) and 5(b), showing their separate drainage arrangements.

FIG. 6 shows how it is preferred that separate drain ducts 208 run from each drain pan 196 of a multi-bin appliance 2. This minimises the risk of cross-contamination. Each duct 208 includes a U-bend 210 defining a sealing water trap and drains separately to a common tray 212. That tray 212 may be located above a compressor 214 of the appliance 2 as shown so that, over time, heat emanating from the compressor 214 evaporates the water from the tray 212 at least as quickly as that water accumulates in the tray 212. In addition or in the alternative, the condenser fan of the appliance 2 (not shown) can blow across the surface of water in the tray 212 so as to promote its evaporation.

Figure 7A:
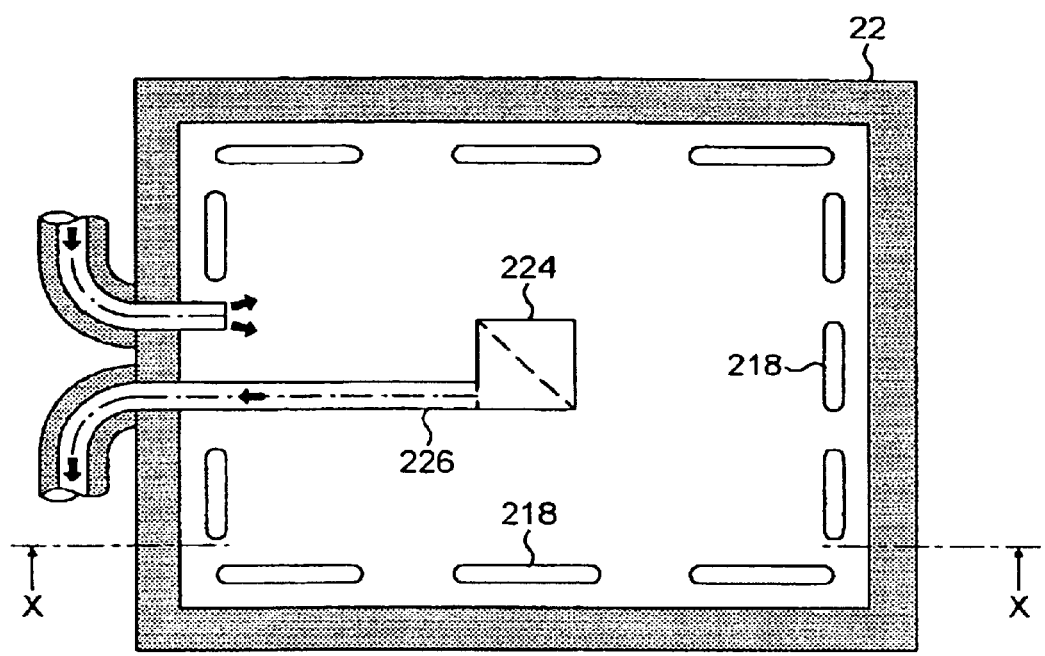
FIGS. 7(a) and 7(b) are a bottom plan view and a sectional side view respectively of a lid adapted for use in a fan coil cooling system.
Figure 7B:
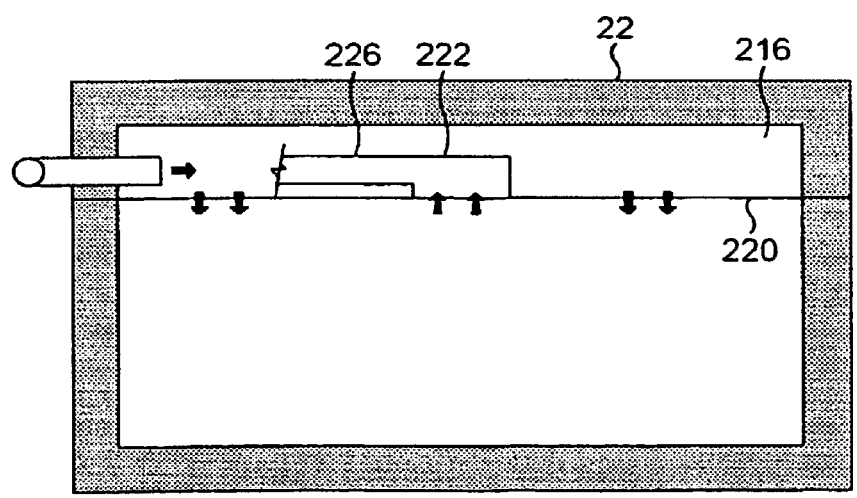

FIGS. 7(a) and 7(b) show a further lid design suitable for use in a fan coil cooling system in which air is supplied to the bin 16 and extracted from the bin 16 via a remote fan coil unit. Such a system is also known as a forced air system, and the lid 22 in FIGS. 7(a) and 7(b) is hollow and partitioned to govern the flow of air on which such systems depend. Thus, cold air cooled by a heat exchanger (not shown) is piped under pressure from a fan (not shown) into a supply air plenum 216 disposed peripherally within the lid 22, from which that air enters the bin through supply air diffusion slots 218 around a base panel 220 defining the underside of the lid 22. Warmer air is extracted from the bin 16 through a centrally-disposed return air plenum 222 that communicates with the bin 16 through a central hole 224 in the base panel 220 and with the fan through a pipe 226 extending through the surrounding supply air plenum 216. The warmer air is drawn into the return air plenum 222 under low pressure created by the fan, and is then sent to the heat exchanger to be cooled and recirculated via the supply air plenum 216.

Figure 8B:
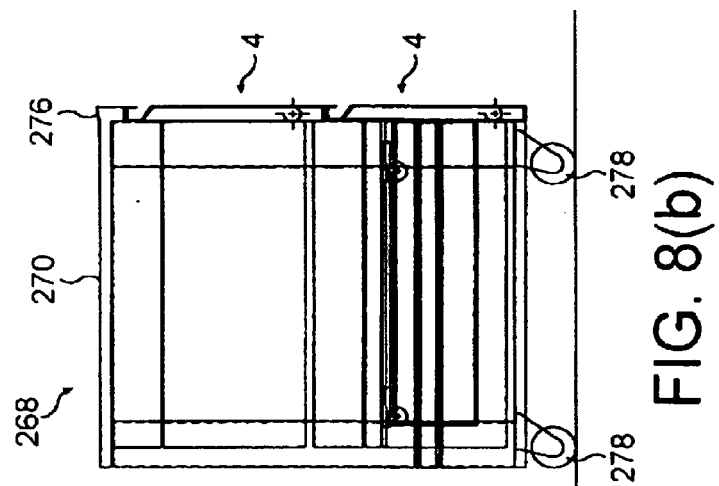
FIGS. 8(a), 8(b) and 8(c) are front and side elevation views and an enlarged partial cross-sectional detail view of a bench-type cold-storage appliance having an alternative layout to that shown in FIGS. 1 to 4.
Figure 8C:
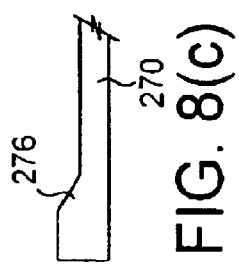
Figure 8A:
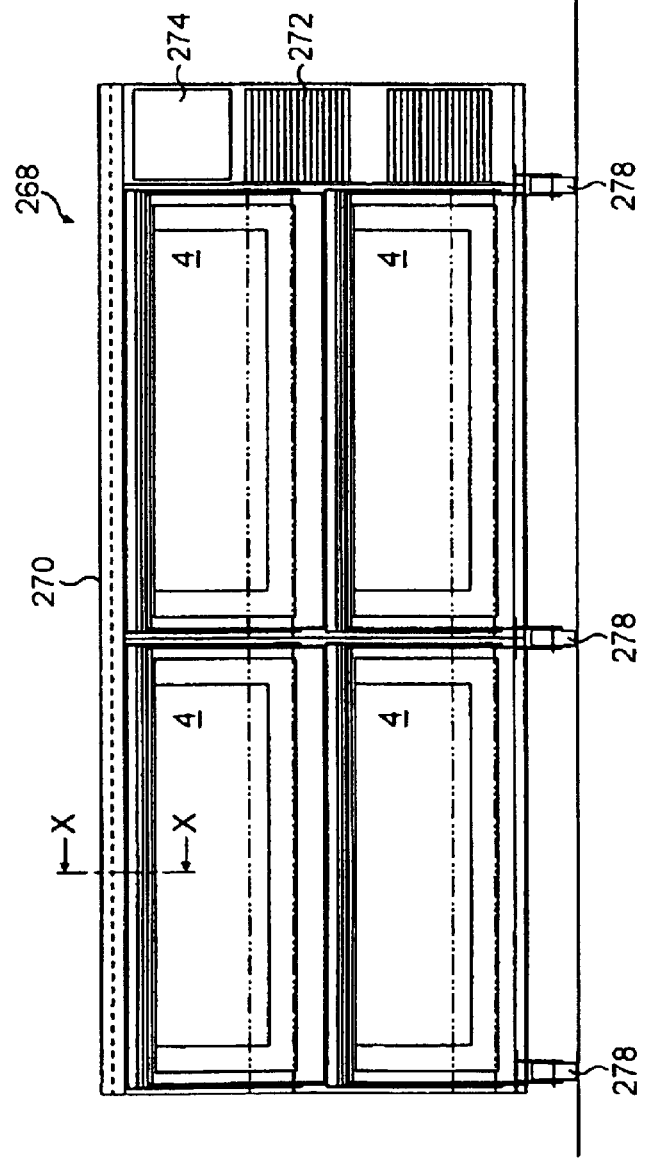

Apart from the vertical array of drawers 4 common to the embodiments described above, a side-by-side arrangement of drawers 4 is also contemplated as shown in FIGS. 8(a), 8(b) and 8(c). The front view of FIG. 8(a) shows a four-drawer bench-type appliance 268 in which the drawers 4 are in two adjacent columns of two drawers 4 each. Thus, the appliance 268 is low enough to have a worktop 270 over the drawers 4, straddling the two columns. This embodiment of the invention is therefore suitable for use as a refrigerated food preparation and/or servery unit.

The depth of the drawers 4 is maximised within the limited available height by mounting the refrigerator engine 272 and control panel 274 in a side-slung position to one side of the appliance 268 as shown. Also, the side view of FIG. 8(b) and the enlarged detail cross-sectional view of FIG. 8(c), taken on line X—X of FIG. 8(a), shows that the front edge of the worktop 270 has a raised lip 276 that helps to prevent spillages on the worktop 270 dripping down onto or into the drawers 4 below.

FIGS. 8(a) and 8(b) also show how an appliance 268 of the invention can be mounted on castors 278; those castors 278 can be height-adjustable to level the appliance 268 on a non-level floor 280.

Referring now to FIG. 9(a), this is a front elevation of a cold-storage appliance 332 that is functionally akin to the aforementioned Ewen prior art—in that much of the bin exterior may be exposed to air below ambient temperature—but addresses many of its problems. In outward appearance, the appliance of FIG. 9(a) is similar to the bench-type appliance shown in FIGS. 8(a) and 8(b) and has its drawers 4, control panel 274 and refrigerator engine 272 in similar positions under a worktop 270. Similarly, FIG. 9(b)—a section on line A—A of FIG. 9(a)—shows that each drawer 4 comprises a lid 22 within the cabinet and a bin 16 movable forwardly from the cabinet on telescopic runners 74. FIG. 9(c)—a section on line B—B of FIG. 9(a)—shows those runners 74 beside the bin 16.

However, like Ewen and unlike the preceding embodiments, there is no provision for vertical movement of the bin 16 with respect to the lid 22: instead, the bin 16 simply slides horizontally past the close-fitting lid 22. The gap between the bin 16 and the lid 22 that is therefore necessary requires the creation of a complete external vapour barrier around the compartment that houses each drawer, so as to overcome the associated moisture transmission and cross-contamination problems. Thus, as FIG. 9(b) shows, the front panel 118 of each drawer extends beyond the corresponding drawer aperture defined between the lids 22 or between a lid 22 and a bottom panel 334. The overlapping portion of each front panel 118 has vertical magnetic seals 336 on its rear face that, when the drawer 4 is closed, seal by flexible resilience and magnetic attraction against the opposed front faces of the lids 22 and/or the bottom panel 334 as appropriate. The drawer compartments are also sealed from each other; this applies especially to penetrations and service connections that run between neighbouring drawer compartments. It also applies to water drainage from the drawer compartments: separate drain lines (not shown) should be run individually from each compartment and should each have in-line water traps, akin to the drainage arrangement shown in FIG. 6 above.

FIG. 9(c) also shows L-section bin supports 338 depending from the runners 74 to cradle the bin 16 in a removable manner. Each drawer compartment should be of the minimum volume that allows access to the bin 16 and the associated runners 74.

Ideally, the walls of each drawer compartment should be of a thin, poorly-insulating material with all of the external surfaces exposed to ambient air. That ideal is not practically achievable, although use of a thin material that conducts heat from outside the drawer compartment and promotes convection of heat within the drawer compartment is to be encouraged. In reality, a temperature gradient will form over time inside the sealed compartments due to the insulating effect of the external enclosure and the air cavity around the bin 16, coupled with the refrigerating effect of the gap between the bin 16 and the lid 22. Additionally, an insulation trap will occur where external surfaces of a compartment are adjacent to other compartments. This further cools the air around the bin 16 and so increases the temperature gradient.

Figure 10A:
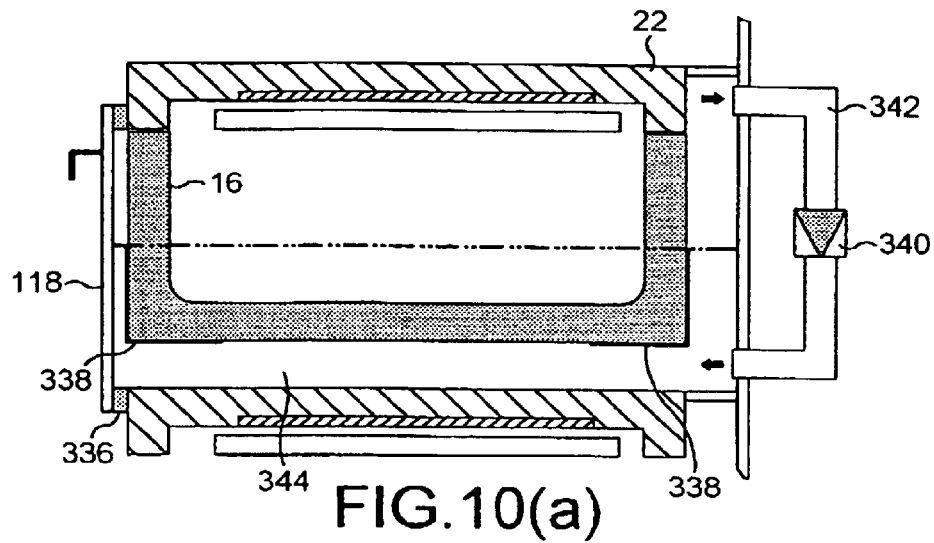
FIGS. 10(a), 10(b), and 10(c) are partial sectional side views showing various ways of preventing temperature gradients within each compartment of the appliance of FIGS. 9(a), 9(b) and 9(c)
Figure 10B:
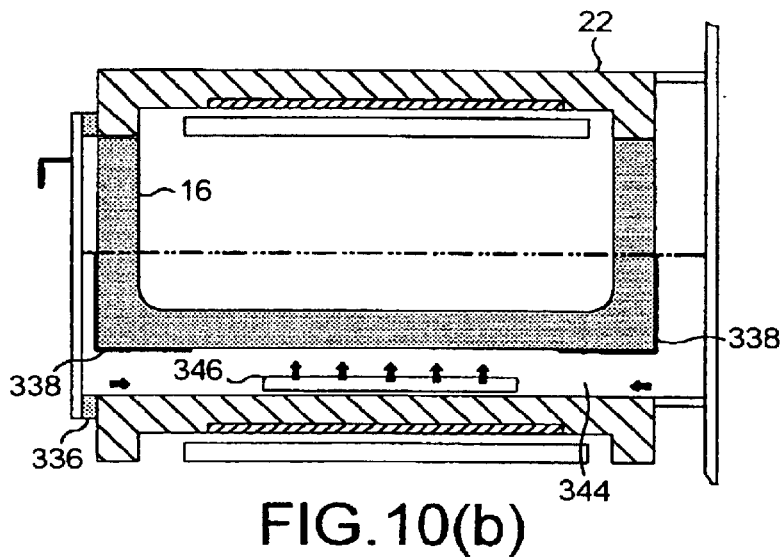
Figure 10C:
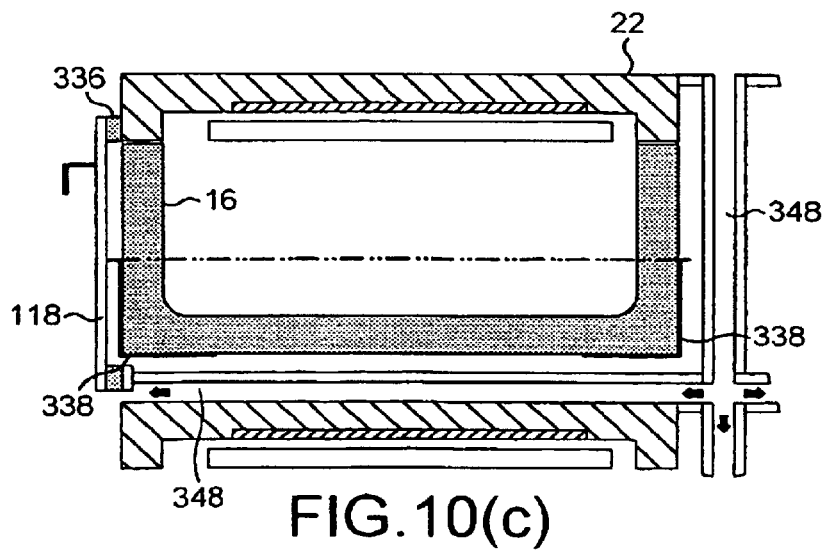

For this reason, FIGS. 10(a), 10(b), and 10(c) propose three different ways of minimising the effects of temperature gradients and cooling within each drawer compartment of the appliance of FIGS. 9(a), 9(b) and 9(c). FIG. 10(a) shows a circulating fan 340 in a duct 342 behind the drawer compartment 344 that draws air from and pumps air back into the compartment 344. The circulation thus created in the air within the compartment 344 keeps the external surfaces of the bin 16 at an even temperature. FIG. 10(b) shows an electric or hot gas heater 346 below the bin 16 to create convection currents in the air within the compartment 344 and to warm most of the external surfaces of the bin 16 to near-ambient, ambient or even higher than ambient temperature. FIG. 10(c) shows air gaps 348 akin to those described above with reference to FIGS. 1 to 4, save that the air gaps 348 are around and between the drawer compartments 334 rather than around the bin 16 itself. Although not visible in FIG. 10(c), the air gaps 348 can extend over the sides of the drawer compartment 334 as well as the underside and back of that compartment 334 as shown. Again, air within the air gaps 348 can be warmed if needs be.

Figure 11:
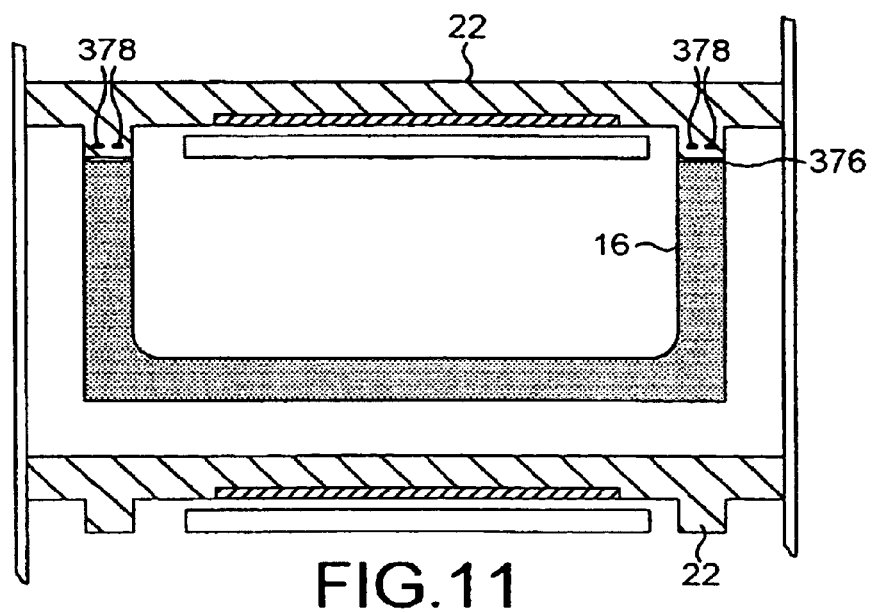
FIG. 11 is a partial sectional side view showing trace heating between a bin and its lid to prevent freezing at the bin/lid interface.

FIG. 11 of the drawings shows that trace heating may be applied locally to the skirt depending from the lid 22 so as to prevent icing at the bin/lid interface 376. The heating may be effected by electric elements 378 or hot gas means, and may be continuous or applied only when it is desired to open the bin 16.

Among many variations of the invention herein, the trace heating facility of FIG. 11 could be applied to any of the foregoing arrangements in which relative movement (preferably vertical movement) between the lid 22 and the bin 16 breaks the seal and clears the bin 16 from the lid 22 (or vice versa) so that the bin 16 can be opened fully for access.

It is also possible for heat to be recovered from various heat-emitting parts of refrigerator engines, such as heat exchangers, motors and so on, and applied to warming the bin/lid interface or the external surfaces of the bin 16 within a drawer compartment. This saves energy by using waste heat that would otherwise be rejected to atmosphere.

Figure 12:
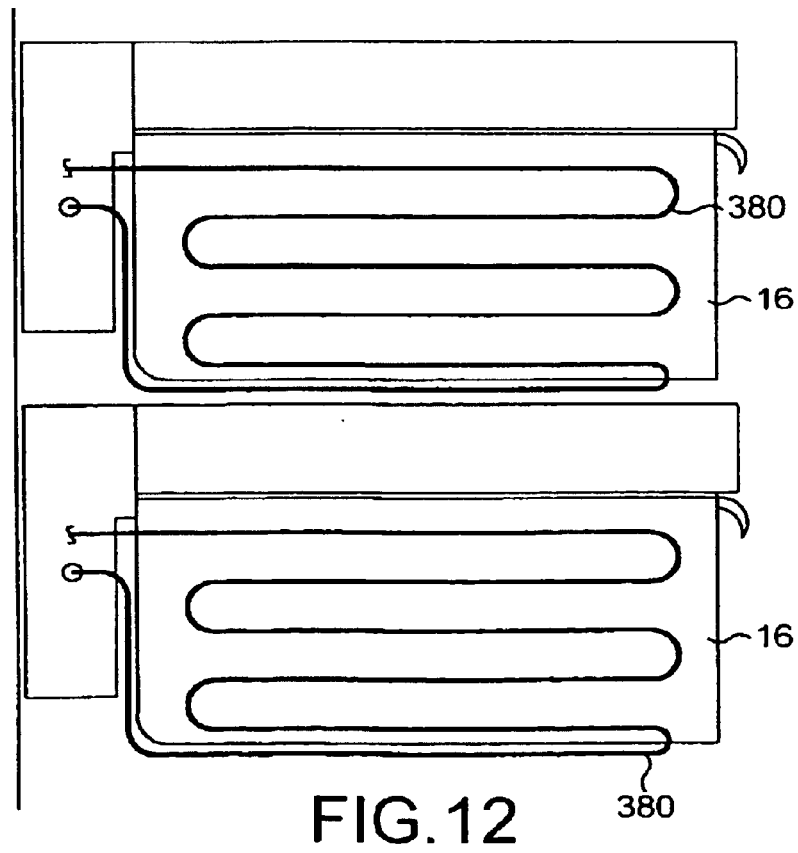
FIG. 12 is a schematic side view of two lidded bins, each having heating elements to warm their exposed external surfaces.

The idea of warming the external surfaces of the bin 16 within a drawer compartment is expanded upon in FIG. 12 which shows a serpentine heating element 380 on or facing one external side face of a bin 16. A corresponding heating element (not shown) would be on or facing the other external side face of the bin 16 and could also be on or facing the bottom and rear external faces of the bin 16, underneath and behind the bin 16. The element 380 can be fed from a refrigeration liquid line at circa 40 Celsius or from a hot gas line at circa 80 Celsius. Reference is made to FIGS. 14(a), 14(b) and 14(c) in this respect. Alternatively, the element 380 could be a low-power electrical resistance element or be replaced with trace heating pads.

Figure 13:
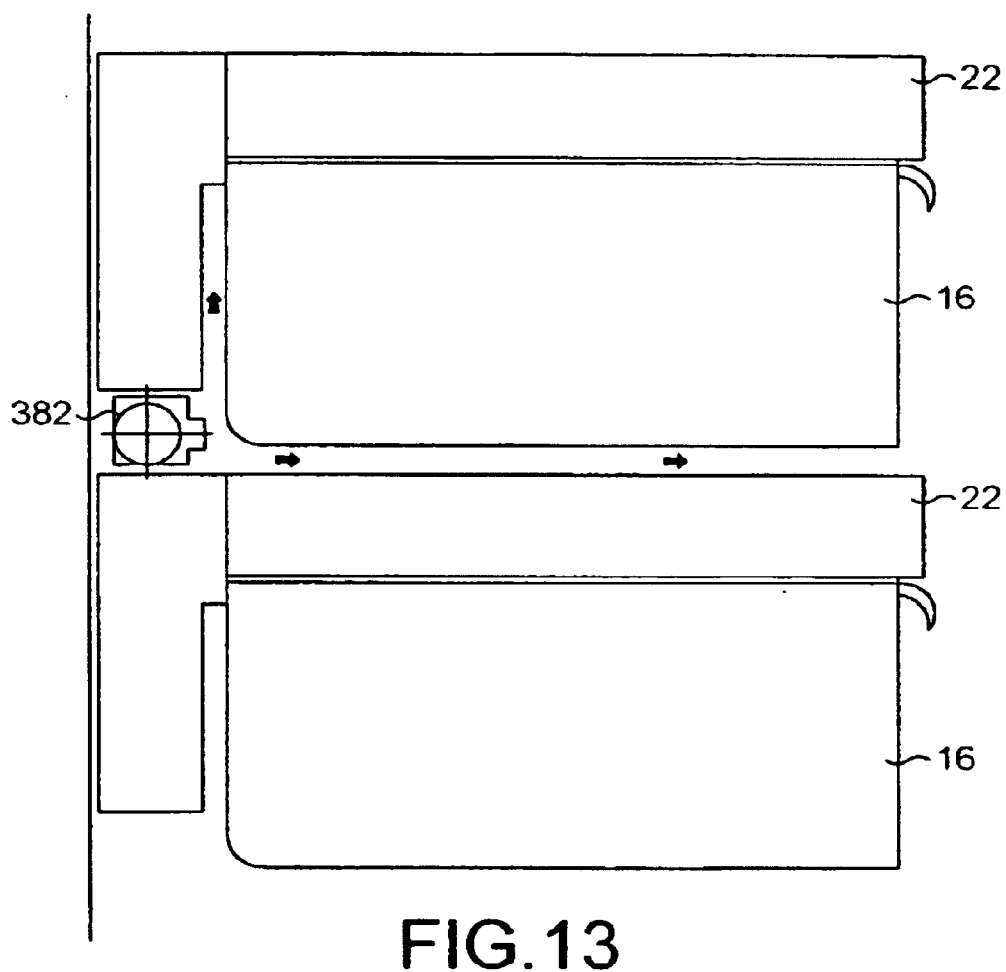
FIG. 13 is a schematic side view corresponding to FIG. 12 but showing a fan for blowing air over exposed external surfaces of a bin, the air optionally being heated.

FIG. 13 shows how a tangential fan 382 or centrifugal impeller can be used to blow warm air around the external surfaces of the bin 16. The warm air may, for example, be derived from a condenser heat exchanger matrix within the appliance, or otherwise from heat-generating parts of the appliance such as fan or compressor motors. A further benefit of fan-assisted airflow, whether heated or not, is that it helps to prevent condensation that may otherwise be experienced in the air gap between the bottom of a bin 16 and the lid 22 of another bin 16 below.

Whilst the work done by compressing air can be expected to raise its temperature somewhat, that effect would typically be so slight as to be negligible for the purposes of warming the external surfaces of a bin to above-ambient temperature.

FIGS. 14(a), 14(b) and 14(c) are sectional views that show in detail how a tangential fan 382 or centrifugal impeller can be part of a fan coil unit 384 mounted behind a bin 16. The components of the fan coil unit 384 are best appreciated in FIG. 14(a) and comprise an insulated generally cuboidal casing 386 extending across the back of a drawer compartment behind a bin 16. The casing 386 has forwardly-extending ducts that communicate with the bin 16 via a lid 22, namely a central supply air duct 388 flanked by two return air ducts 390.

The central supply air duct 388 is aligned with the tangential fan 382 which is generally cylindrical and spins about a horizontal axis near the top of the casing 386, powered by a motor 392. As the fan 382 does so, it impels cold air out of the casing 386 through the central supply air duct 388 and into the bin 16 via ducts (not shown) in the lid 22.

A cooling coil 394 is supported within the casing 386 immediately beneath the fan 382, in such manner that gaps are left beyond the ends of the coil 394 beneath the return air ducts 390. The cooling coil 394 comprises a serpentine finned element through which relatively warm air rises, drawn by the fan 382, and by which that air is cooled before being impelled by the fan 382 into the bin 16. The relatively warm air is that which is drawn into the casing 386 from the bin 16 through the return air ducts 390. FIG. 14(a) shows that this air initially falls through the gaps beyond the ends of the cooling coil 394 toward the base of the casing 386 in two streams which then turn inwardly and upwardly toward the matrix of the cooling coil 394, merging to some extent as they do so. Optional air turning vanes 396 on one or both inner sides of the casing 386 (only one side is shown) assist this change of direction.

FIG. 14(a) also shows connections to the cooling coil 394, being a liquid line 398 for supplying liquid refrigerant to an upper end of the coil 394, a hot gas inlet line 400 also coupled to the upper end of the coil 394, and a suction line 402 coupled to the lower end of the coil 394 for drawing refrigerant from the coil 394.

FIG. 14(a) also shows how the base of the casing 386 supports a drain pan 404 to catch moisture dripping from the cooling coil 394. Moisture drains from the drain pan 404 through a drain line 406. Advantageously, as shown, the hot gas inlet line 400 extends along the drain pan 404 to defrost it and hence promote the free flow of water along the drain pan 404 and out through the drain line 406.

Whilst the solutions described in FIGS. 10 to 14 above are primarily intended to solve problems with refrigerators akin to the prior art exemplified by Ewen, some or all of those solutions can be applied to refrigerators designed in accordance with the Applicant's referenced co-pending International and U.S. patent applications.

The invention has wide-ranging applications and benefits for storing, handling, distributing, transporting and delivering items in the right condition, notably:

precise variable temperature and humidity control that could even include heating rather than merely cooling;

mechanical protection of stored items;

sterile storage with minimal risk of cross-contamination;

the option of storage in partial vacuum conditions;

the option of storage in a preservative holding gas environment;

isolation of stored items against vibration and agitation; and containment of, or protection against, radiation and bio hazards.

In general, therefore, reference should be made to the appended claims and other general statements herein rather than to the foregoing specific description as indicating the scope of the invention. In interpreting the invention, it should be understood that although features of the illustrated embodiments have been described in combination with each other and although such combinations may have advantages of their own, many of those features can be applied independently. So, those features are considered to be independently patentable whether within or beyond the inventive concepts expressed herein.

What is claimed is:

1. A cold-storage appliance comprising:

at least one container defining external surfaces comprising at least first and second side external surfaces;

a structure defining a container compartment from which the container can be withdrawn to open the container and to afford access to its interior and to which the container can be returned to close the container for cold storage of any items within the container; and heating means for warming at least the first and second side external surfaces of the container when in the container compartment.

2. The appliance of claim 1, wherein the heating means is arranged to warm the external surface of the container to above ambient temperature.

3. The appliance of claim 1, wherein the heating means employs heat recovered from heat-emitting parts of the appliance.

4. The appliance of claim 3, wherein the heat emitting parts include a refrigerator engine, a heat exchanger or a motor.

5. The appliance of claim 1, wherein the container compartment includes a heating element or pad facing the exterior of the container.

6. The appliance of claim 1, wherein the exterior of the container includes a heating element or pad.

7. A cold-storage appliance comprising:

an open-topped insulating container defining external surfaces comprising first and second side external surfaces;

an insulating lid adapted to close the open top of the container;

a cooling means adapted to cool the interior of the container; and a structure supporting the container, the lid and the cooling means;

wherein the container is mounted to the structure for movement relative to the structure and to the lid to open the container and to afford access to its interior or to close the container, and wherein at least the first and second side external surfaces of the container are exposed to air above ambient temperature when the container is closed by the lid.

8. A cold-storage appliance comprising:

at least one container defining an external surface;

a structure defining a container compartment from which the container can be withdrawn to open the container and afford access to its interior and to which the container can be returned to close the container for cold storage of any items within the container; and circulating means comprising a fan for circulating air around the container compartment to expose the external surface of the container therein to said circulating air.

9. A cold-storage appliance comprising:

at least one container defining an external surface;

a structure defining a container compartment from which the container can be withdrawn to open the container and afford access to its interior and to which the container can be returned to close the container for cold storage of any items within the container; and circulating means for circulating air around the container compartment to expose the external surface of the container therein to said circulating air, wherein the circulating means comprises a heater creating a convection current within the container compartment.

10. A cold-storage appliance comprising:

at least one container defining an external surface;

a structure defining a container compartment from which the container can be withdrawn to open the container and afford access to its interior and to which the container can be returned to close the container for cold storage of any items within the container; and circulating means for circulating air around the container compartment to expose the external surface of the container therein to said circulating air, wherein the circulating means comprises a heater creating a convection current within the container compartment and being positioned below the container when the container is in the container compartment.

11. A cold-storage appliance comprising:

at least one container defining an external surface;

a structure defining a container compartment from which the container can be withdrawn to open the container and afford access to its interior and to which the container can be returned to close the container for cold storage of any items within the container; and circulating means for circulating air around the container compartment to expose the external surface of the container therein to said circulating air, wherein the circulating means derives warm air from heat-generating parts of the appliance.

12. The appliance of claim 1, further comprising trace heating means for applying heat locally to an interface between the container and a lid closing the container.

13. The appliance of claim 12, wherein the trace heating means employs electric elements and/or a fluid conduit.

14. The appliance of claim 13, wherein the fluid conduit contains refrigeration liquid or hot gas.

15. The appliance of claim 12, wherein trace heating is applied continuously.

16. The appliance of claim 12, wherein trace heating is applied only when it is desired to open the container.

17. The appliance of claim 1, wherein the heating means is also for warming bottom and rear external surfaces of the container when in the container compartment.

18. The appliance of claim 1, further comprising circulating means for circulating air around the container compartment to expose the external surface of the container therein to said circulating air.

19. The appliance of claim 18, wherein the circulating means includes a fan.

20. The appliance of claim 18, wherein the circulating means includes a heater creating a convection current within the container compartment.

21. The appliance of claim 20, wherein the heater is positioned below the container when the container is in the container compartment.

22. The appliance of claim 18, wherein the circulating means derives warm air from heat-generating parts of the appliance.

23. The appliance of claim 7, further comprising circulating means for circulating air around the container compartment to expose the external surface of the container therein to said circulating air.

24. The appliance of claim 23, wherein the circulating means includes a fan.

25. The appliance of claim 23, wherein the circulating means includes a heater creating a convection current within the container compartment.

26. The appliance of claim 25, wherein the heater is positioned below the container when the container is in the container compartment.

27. The appliance of claim 23, wherein the circulating means derives warm air from heat-generating parts of the appliance.

* * * * *